April 29, 1941.　　　W. R. KOCH　　　2,240,304
MEASURING AND INDICATING INSTRUMENT
Filed July 30, 1938
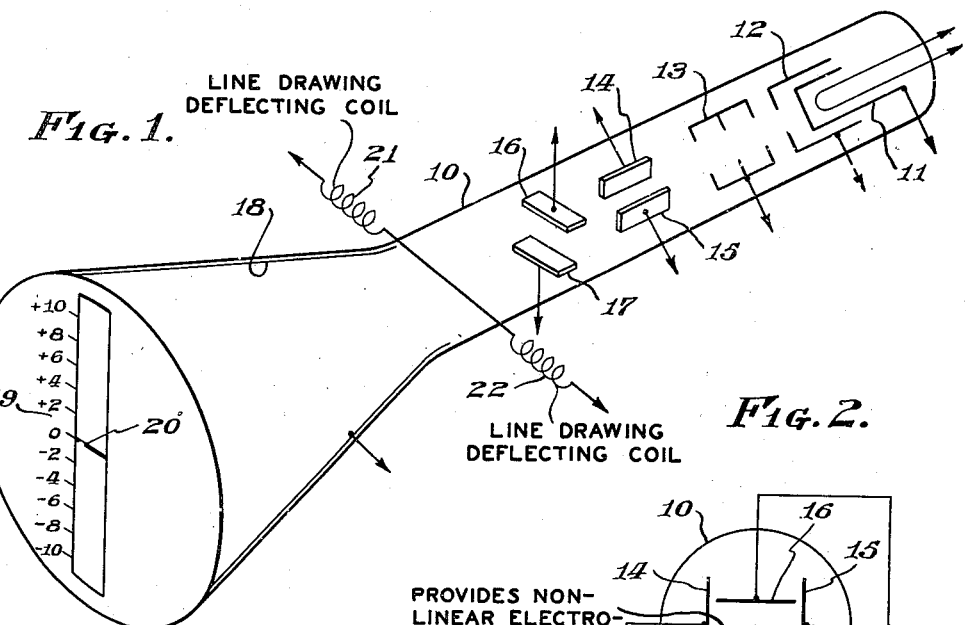
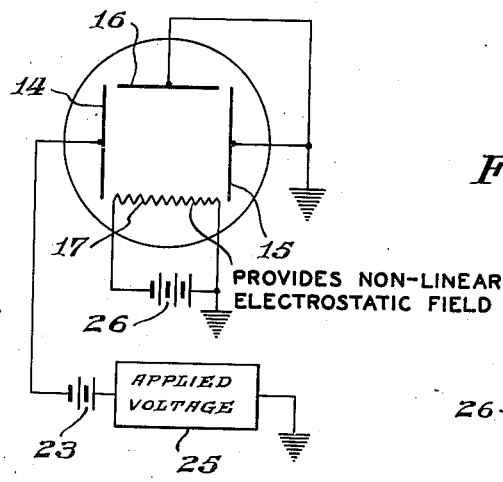
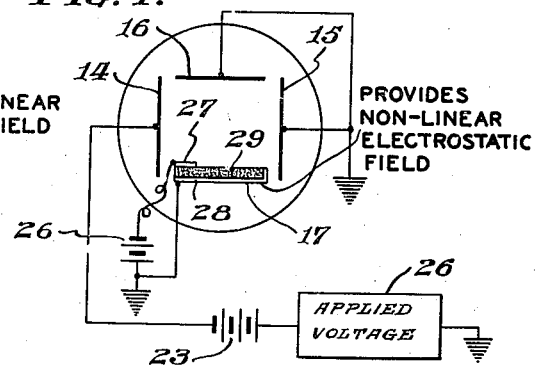
Inventor
Winfield R. Koch
By
Attorney Patented Apr. 29, 1941

2,240,304

UNITED STATES PATENT OFFICE 2,240,304

MEASURING AND INDICATING INSTRUMENT

Winfield R. Koch, Haddonfield, N. J., assignor to Radio Corporation of America, a corporation of Delaware Application July 30, 1938, Serial No. 222,109

7 Claims. (Cl. 250—158)

This invention relates to measuring and indicating instruments such as are utilized to measure or indicate the condition of an electrical circuit, and has for its principal object the provision of an improved instrument and method of operation whereby a non-linear function, such as the logarithm of the quantity under consideration, may be readily ascertained.

A distinguishing feature of the invention is a cathode ray device including a deflecting plate of such character as to produce a logarithmic or other non-linear indication of the electrical characteristic under consideration. To this end, in one embodiment of the invention, this deflecting plate is so contoured with respect to the other deflecting plates of the tube that the inter-plate electrostatic field varies non-linearly in accordance with the characteristic to be measured. In an alternative embodiment, the potential gradient between the opposite edges of this plate is such as to deflect the cathode ray in a vertical direction, for example, to positions indicative of the desired function.

A further feature is the provision of means for deflecting the cathode ray in one plane so that a fluorescent line or the like may be utilized in conjunction with a scale for reading the indicated characteristic.

The invention will be better understood from the following description considered in connection with the accompanying drawing and its scope is indicated by the appended claims.

Referring to the drawing,

Figure 1 is a perspective view of the cathode ray tube which is the basis of the improved measuring instrument, Figure 2 is a wiring diagram illustrating certain connections of the instrument and also showing one of the deflecting plates contoured in accordance with the function to be indicated, Figure 3 differs from Fig. 2 in that one of the deflecting plates is so constructed and energized that a desired potential gradient is established between its opposite edges, and Figure 4 is similar to Fig. 3 but involves a somewhat different method of establishing the potential gradient along the electrode surface.

The cathode ray tube of Fig. 1 includes an envelope 10 within which are mounted a cathode 11, a grid or intensity control electrode 12, a first anode or focusing electrode 13, horizontal deflecting plates 14—15, vertical deflecting plates 16—17 and a second anode 18 which may be associated with a fluorescent screen or the like for indicating on a scale 19 the vertical position of the cathode ray projected from the cathode 11.

As is well known, the cathode ray would usually be in the form of a spot more or less diagonally across the screen in response to variations of the potentials applied to the deflecting electrodes 14—15 and 16—17. In order to produce a straight line indication 20 at the scale 19, there is provided a pair of coils 21—22 connected to a source of alternating current, which function to deflect the ray in a horizontal direction independently of the action of the deflecting electrodes, thus permitting its position with respect to the scale 19 to be readily observed. A third pair of deflecting plates may be used instead of the coils if desired.

It will, of course, be understood that suitable potentials are applied to the various electrodes and coils of the cathode ray tube, the circuits through which these potentials are applied having been omitted for the reason that they are well known and are incidentally involved in the present invention.

As indicated by Fig. 2, the voltage to be measured, which may be D. C. or rectified and smoothed alternating voltage, is applied through a bias battery 23 to the deflecting electrodes 14, 15 and 16, and there is applied through the battery 24 to the deflecting plate 17 a potential which produces an electrostatic field between electrodes 16 and 17 whose lines of force are substantially perpendicular to the normal axis of the beam and perpendicular to the lines of force produced by electrodes 14 and 15. The potential gradient of this field varies from point to point along a line intermediate the electrode perpendicular to the horizontal deflecting plates 14 and 15, that is, the potential gradient is non-uniform along this line. In the preferred case the non-uniformity is logarithmic. The potential due to the vertical plates 16 and 17 affecting the beam as it moves horizontally varies in accordance with this change in gradient, producing a vertical deflection which is a function of the gradient, and hence of the surface contour of the plate 17.

Under these conditions, the cathode ray is deflected horizontally in accordance with the potential of the source 25 and is deflected vertically in accordance with a non-linear function of this potential, the particular function indicated being determined by the surface contour of the plate 17.

The modification of Fig. 3 differs from that of Fig. 2 in that the electrode is made in the form of a resistor element and the potential gradient between its opposite edges facing electrodes 14 and 15, respectively, is produced by current supplied from a source 26, thus establishing an electrostatic field having a similar gradient along a line perpendicular to the cathode ray.

Another suitable form of the non-linear deflecting electrode is shown by Fig. 4 wherein this electrode comprises opposed electrodes 27 and 28 for applying between the transverse edges of a body 29 of carbon or the like a potential whereby the desired potential gradient along the surface of the plate 17 is established. As herein employed, the term "transverse edges" refers to the opposite edges of the electrode which are parallel to the axis of the beam.

The improved instrument of this invention is superior to previous instruments for the following reasons: Because an electron beam has no inertia, it is possible to add electrical inertia in any desired degree by means of resistor-capacitor combinations, and thus to obtain any desired time constant; because the proposed system involves but a slight modification of existing cathode ray tubes it is relatively inexpensive; since no delicate meter mechanism is used and since there are no mechanical moving parts the possibility of damage from overloading is greatly reduced; and by merely rotating the deflecting coils 21, 22 and the scale 19 through 90° the symmetrical plates 14, 15 can be used to provide linear displacement of the indication line 20.

I claim as my invention:

1. A cathode ray tube comprising means for producing a concentrated electron ray beam; a first pair of electrodes for deflecting said beam in a given direction in accordance with the amplitude of a voltage to be indicated; means including a second pair of electrodes for establishing a constant electrostatic field whose lines of force are substantially perpendicular to said beam and to said given direction, the intensity of said field being non-uniform in said given direction so that the deflection of said beam in said given direction produces a deflection in a direction perpendicular thereto, and auxiliary deflecting means operable on said beam to oscillate said beam in said given direction to produce an indicating line, the position of said line being a nonlinear function of the amplitude of said voltage to be indicated.

2. A cathode ray tube comprising means for producing a concentrated electron ray beam; a pair of electrodes for deflecting said beam in a given direction in accordance with an applied voltage; and means including a second pair of electrodes for establishing a fixed electrostatic field whose lines of force are perpendicular to said given direction and non-uniform in density along said given direction so that the position of said beam in a direction perpendicular to said given direction is a function solely of the deflection of said beam in said given direction.

3. A cathode ray tube comprising means for producing a concentrated electron beam; a pair of electrodes for deflecting said beam in a horizontal direction in a plane perpendicular to said electrodes; means including a second pair of electrodes for establishing a fixed electrostatic field of nonuniform intensity in said horizontal direction; and auxiliary deflecting means for independently deflecting said beam in a horizontal plane whereby an indicating line is produced whose vertical deflection is a function of the voltage applied to said first pair of electrodes.

4. A cathode ray device comprising means for producing a concentrated beam of electrons, a first pair of electrodes for deflecting said beam in a given direction, and means including a second pair of deflecting electrodes for establishing a fixed electrostatic field whose lines of force are perpendicular to said given direction and the axis of said beam, the potential gradient of said field being different at points along said given direction so that said beam is deflected in another direction perpendicular to said given direction as a function of its deflection in said given direction, and means for indicating only said deflection in said other direction, said deflection being a nonlinear function of the deflection produced by said first pair of electrodes.

5. A cathode ray tube comprising means for producing a concentrated electron beam; two pairs of deflecting electrodes; means for applying a voltage to be indicated to the first pair of electrodes; means for establishing a fixed potential between the second pair of electrodes; one electrode of said second pair being curved so as to produce an electrostatic field of nonuniform intensity along a line perpendicular to the first pair of electrodes and perpendicular to said beam so that the deflection of said beam in a direction perpendicular to said first electrode is determined by its position in said field.

6. A device of the character described in claim 4 in which said second pair of deflecting electrodes includes an electrode comprising a resistive material mounted on a conductive base and having an electrode in contact with the upper edge adjacent one of said first pair of deflecting electrodes.

7. A cathode ray tube comprising means for producing an electron beam; a fluorescent screen for producing a light image indicative of the position of said beam; means for establishing a steady electrostatic field whose lines of force are perpendicular to the axis of said beam and whose intensity is nonuniform in a horizontal direction; means for controlling the horizontal position of said beam in said field in accordance with a voltage or current to be indicated to produce a resultant vertical deflection the amplitude of which is determined by the field intensity at the given position of said beam; auxiliary deflecting means located between said screen and said controlling means for independently oscillating said beam in a horizontal plane to produce an indicating line, the vertical displacement of said line being a function of said voltage or current to be indicated.

WINFIELD R. KOCH.